US010233124B2

(12) United States Patent
Vieweger

(10) Patent No.: US 10,233,124 B2
(45) Date of Patent: Mar. 19, 2019

(54) METHOD FOR PRODUCING A MOLDED ARTICLE AND MOLDED ARTICLE

(71) Applicant: HUG ENGINEERING AG, Elsau (CH)

(72) Inventor: Georg Vieweger, Salem (DE)

(73) Assignee: Hug Engineering AG, Elsau (CH)

( * ) Notice: Subject to any disclaimer, the term of this patent is extended or adjusted under 35 U.S.C. 154(b) by 312 days.

(21) Appl. No.: 14/848,964

(22) Filed: Sep. 9, 2015

(65) Prior Publication Data

US 2015/0376070 A1   Dec. 31, 2015

Related U.S. Application Data

(63) Continuation of application No. PCT/EP2014/054400, filed on Mar. 6, 2014.

(30) Foreign Application Priority Data

Mar. 12, 2013  (DE) ........................ 10 2013 204 276

(51) Int. Cl.

| C04B 38/00 | (2006.01) |
| C04B 35/64 | (2006.01) |
| C04B 35/185 | (2006.01) |
| C04B 35/195 | (2006.01) |
| B01D 46/24 | (2006.01) |
| B01J 21/12 | (2006.01) |
| B01J 29/70 | (2006.01) |
| B01J 35/00 | (2006.01) |
| B01J 35/02 | (2006.01) |
| B01J 37/08 | (2006.01) |
| C04B 111/00 | (2006.01) |

(52) U.S. Cl.

CPC .............. *C04B 35/64* (2013.01); *B01D 46/24* (2013.01); *B01J 21/12* (2013.01); *B01J 29/70* (2013.01); *B01J 35/0006* (2013.01); *B01J 35/02* (2013.01); *B01J 37/08* (2013.01); *C04B 35/185* (2013.01); *C04B 35/195* (2013.01); *C04B 38/0006* (2013.01); *C04B 2111/0081* (2013.01); *C04B 2111/00793* (2013.01); *C04B 2235/3201* (2013.01); *C04B 2235/3205* (2013.01); *C04B 2235/3217* (2013.01); *C04B 2235/3244* (2013.01); *C04B 2235/3248* (2013.01); *C04B 2235/3463* (2013.01); *C04B 2235/3481* (2013.01); *C04B 2235/5436* (2013.01); *C04B 2235/5463* (2013.01); *C04B 2235/6567* (2013.01); *C04B 2235/80* (2013.01)

(58) Field of Classification Search

CPC ..... C04B 35/64; C04B 35/185; C04B 35/195; C04B 2235/3217; C04B 2235/3248
USPC ................................................ 264/630, 631
See application file for complete search history.

(56) References Cited

U.S. PATENT DOCUMENTS

| 4,295,892 | A | | 10/1981 | Matsuhisa et al. |
| 4,788,162 | A | * | 11/1988 | Hillig ..................... C04B 35/18 264/332 |
| 4,820,666 | A | | 4/1989 | Hirano et al. |
| 4,855,259 | A | | 8/1989 | Claussen et al. |
| 5,073,178 | A | * | 12/1991 | Mimori ............... C04B 41/5022 55/302 |
| 5,198,006 | A | | 3/1993 | Mimori et al. |
| 5,270,270 | A | | 12/1993 | Semar et al. |
| 5,305,726 | A | | 4/1994 | Scharman et al. |
| 5,407,734 | A | * | 4/1995 | Singh ....................... B32B 5/22 442/391 |
| 5,846,891 | A | | 12/1998 | Son et al. |
| 6,087,281 | A | * | 7/2000 | Merkel ................. C04B 35/195 501/118 |
| 6,287,510 | B1 | * | 9/2001 | Xun ..................... C04B 35/195 264/630 |
| 6,306,335 | B1 | | 10/2001 | Wallin et al. |
| 8,673,207 | B1 | * | 3/2014 | Boger ................ B01D 46/2425 264/630 |
| 2003/0137071 | A1 | | 7/2003 | Noguchi et al. |
| 2004/0053005 | A1 | * | 3/2004 | Hamanaka ......... B01D 39/2068 428/116 |
| 2011/0143969 | A1 | | 6/2011 | Skala |
| 2012/0100982 | A1 | | 4/2012 | Sugawara |

FOREIGN PATENT DOCUMENTS

| DE | 10 2005 036 394 | 2/2007 |
| EP | 0 545 008 | 6/1993 |
| EP | 0 630 677 | 12/1994 |

(Continued)

OTHER PUBLICATIONS

JP S59-159296 (Miyoshi) Sep. 8, 1984 (English language machine translation). [online] [retrieved Nov. 21, 2017]. Retrieved from: Espacenet. (Year: 1984).*
Acimovic-Pavlovic, et al., "Application effects of Refractory Linings Based on Cordierite and Talc During the Lost Foam Casting Process," *Intercream*, 2000, vol. 49, No. 6, pp. 438-441.
Grosjean, "Whitewares—Cordierite Ceramics," *Intercream*, 1992, vol. 42, No. 1, pp. 11-15.
Hombach, K., et al., "Beobachtungen an Cordierit-Mullit-Werkstoffen," *Silikat-Journal, GEKT: Glas-, Email-, Keramo-Technik*, 1976, pp. 285-289, 291-292, vol. 15, XP009161016.

(Continued)

*Primary Examiner* — Erin Snelting
(74) *Attorney, Agent, or Firm* — Womble Bond Dickinson (US) LLP

(57) ABSTRACT

In order to provide a method for producing a molded article by means of which a molded article with good temperature resistance is easily producible, it is proposed that the method includes providing a mixture including a powdered base material which includes a pre-fired and/or ground cordierite material and/or a pre-fired and/or ground mullite material; producing a molded article by molding the mixture; and firing the molded article so that particles of the base material are bonded to one another while preserving the particulate property.

13 Claims, No Drawings

(56) References Cited

FOREIGN PATENT DOCUMENTS

| | | |
|---|---|---|
| EP | 0 688 745 | 12/1995 |
| EP | 1 428 807 | 6/2004 |
| EP | 1 447 130 | 8/2004 |
| GB | 579515 | 8/1946 |
| GB | 1 527 566 | 10/1978 |
| JP | S59-159296 | 9/1984 |
| WO | WO 2011/149744 | 12/2011 |

OTHER PUBLICATIONS

"Chapter 2: Herstellung feuerfester Werkstoffe"; "Chapter 4: Dichte geformte feuerfeste Erzeugnisse," Praxishandbuch feuerfeste Werkstoffe: Aufbau—Eigenschaften—Prüfung, 2011, pp. 15-19, 38-43, 52-55, 72-77 / table 4.1. XP2726158.

Schulle, W., "Tendenzen der Entwicklung bei Brennhilfsmittelwerkstoffen," *Silikattechnik*, 1985, pp. 313-315, vol. 36(10). XP009161012.

"Chamotte" Report from the Internet found at: URL http://www.chemie.de/lexikon/Schamotte.html [found on Sep. 8, 2018].

\* cited by examiner

METHOD FOR PRODUCING A MOLDED ARTICLE AND MOLDED ARTICLE

CROSS-REFERENCE TO RELATED APPLICATIONS

The present application is a continuation of international application number PCT/EP2014/054400, filed on Mar. 6, 2014, which claims priority to German patent application number 10 2013 204 276.0, filed on Mar. 12, 2013, the entire specification of both being incorporated herein by reference.

FIELD OF DISCLOSURE

The present invention relates to a method for producing a molded article.

BACKGROUND

From DE 10 2005 036 394 A1, there is known a method for producing a molded article in which a workpiece is molded from a base material and is subsequently sintered at temperatures above 1550° C. The starting material is converted by the sintering process.

SUMMARY OF THE INVENTION

It is an object of the present invention to provide a method for producing a molded article by means of which a molded article having good high temperature resistance can be easily manufactured.

This object is achieved according to the invention in that the method for producing a molded article comprises the following:
  providing a mixture comprising:
    a powdered base material which comprises a pre-fired and/or ground cordierite material and/or a pre-fired and/or ground mullite material;
  producing a molded article by molding the mixture;
  firing the molded article so that particles of the base material are bonded to one another while preserving the particulate property.

In that with the method according to the invention, the particles of the base material, in particular the cordierite material and/or the mullite material are bonded to one another while preserving the particulate property, the molded article can be manufactured particularly energy-efficiently and rapidly. In particular, time-intensive sintering at high temperatures following molding of the molded article can be dispensed with.

The powdered base material preferably comprises pre-calcinated cordierite and/or pre-calcinated mullite.

A cordierite material, in particular cordierite can be, for example, cordierite chamotte. A mullite material, in particular mullite, can be, for example, mullite chamotte, sintered mullite and/or fused mullite.

The expression "chamotte" should be understood to mean a fired or pre-fired and subsequently ground material.

The cordierite material and/or the mullite material is preferably contained in the powdered base material in an appreciable quantity, i.e. not only as an impurity. In particular, it can be provided that the powdered base material comprises at least approximately 20% by mass, in particular at least approximately 40% by mass, for example, at least approximately 60% by mass of cordierite material and/or mullite material.

The expression "particulate property" should be understood in this description and the accompanying claims, in particular, to mean that in a scanning electron micrograph (SEM image) of the finished molded article, clear boundaries of the particles can be seen. The particles are preferably embedded and/or integrated with one another, for example by adhesion. Preferably, the particles are not fully melted and fused into a larger body.

A power or powdered substance is to be understood as a substance made of particles which have a small size, in particular smaller than approximately 0.1 mm, for example smaller than approximately 0.05 mm.

Preferably, the molded article receives its shape stability by means of the firing.

It can be favorable if the mixture comprises corundum, zircon mullite and/or zircon silicate.

Corundum can be, for example, sintered corundum and/or fused corundum.

Preferably, the mixture comprises corundum, zircon mullite and/or zircon silicate in powdered form.

In one embodiment of the invention, it is provided that the mixture also comprises an alkali metal-containing and/or alkaline earth metal-containing material and/or that additionally an alkali metal-containing and/or alkaline earth metal-containing material is mixed into the mixture for molding thereof.

It can be provided, in particular, that the powdered base material and/or the mixture is screened, for example, in order to obtain a preferred particle size distribution. The alkali metal-containing and/or alkaline earth metal-containing material is preferably mixed into powered base material and/or the mixture following the screening.

The alkali metal-containing and/or alkaline earth metal-containing material is preferably a plastifying agent, particularly for simplification of the shaping during molding of the mixture.

The alkali metal-containing and/or the alkaline earth metal-containing material preferably comprises lithium (Li), sodium (Na), potassium (K), rubidium (Rb), beryllium (Be), magnesium (Mg), calcium (Ca) and/or strontium (Sr).

In particular, it can be provided that the alkali metal-containing and/or alkaline earth metal-containing material comprises potassium ions. Preferably, the alkali metal-containing and/or the alkaline earth metal-containing material comprises at least approximately 0.1% by mass, for example, approximately 0.5% by mass and/or at most approximately 2% by mass, in particular at most approximately 1.5% by mass of potassium ions.

For example, it can be provided that an aqueous solution with approximately 1% by mass of potassium ions is provided as the alkali metal-containing and/or alkaline earth metal-containing material. For example, an aqueous solution with approximately 1.6% by mass of potassium carbonate ($K_2CO_3$) can be provided.

The alkali metal-containing and/or alkaline earth metal-containing material is preferably a sinter-promoting material.

Preferably, the alkali metal-containing and/or alkaline earth metal-containing material enables bonding of the particles of the base material to one another, for example, a fused bonding of the particles of the base material to one another.

In one embodiment of the invention, it is provided that at least one substance of the mixture, in particular the base material, is screened before a fusion with further substances of the mixture and/or that the whole mixture is screened, in order to obtain a desired grain size distribution (particle size distribution).

In particular, it can be provided that cordierite, mullite, zircon mullite and/or corundum, is screened by itself and is subsequently fused with other substances of the mixture, in particular cordierite, mullite, zircon mullite and/or corundum.

Alternatively or additionally thereto, it can be provided that at least one substance of the mixture, in particular the base material and/or the entire mixture is prepared with a desired grain size distribution (particle size distribution), for example with one of the particle size distributions described below.

In one embodiment of the invention, it is provided that at least one substance of the mixture is screened before a fusion with further substances of the mixture, and/or that the whole mixture is screened, such that the d10 of the at least one substance and/or of the mixture is at least approximately 1 µm, the d50 value of the at least one substance and/or of the mixture is at least approximately 38 µm, and/or the d90 value of the at least one substance and/or of the mixture is at least approximately 60 µm.

A d10 should be understood to mean the particle size which is undershot by 10% of the particles of the at least one substance or of the whole mixture, whilst 90% of the particles of the at least one substance or of the mixture are larger than the d10 value.

A d50 value should be understood to mean the particle size which is undershot by 50% of the particles of the at least one substance or of the whole mixture, whilst 50% of the particles of the at least one substance or of the mixture are larger than the d50 value.

A d90 value should be understood to mean the particle size which is undershot by 90% of the particles of the at least one substance or of the whole mixture, whilst 10% of the particles of the at least one substance or of the mixture are larger than the d90 value.

In one embodiment of the invention, it is provided that at least one substance of the mixture is screened before a fusion with further substances of the mixture, and/or that the whole mixture is screened, such that the d10 of the at least one substance and/or of the mixture is at most approximately 2 µm, the d50 value of the at least one substance and/or of the mixture is at most approximately 49 µm, and/or the d90 value of the at least one substance and/or of the mixture is at most approximately 80 µm.

A median of the at least one substance and/or of the mixture preferably amounts to at least approximately 10 µm and/or at most approximately 20 µm, for example approximately 15 µm.

Preferably, the moulded article has a pore volume (proportion by volume of the pores to the total volume) of at least approximately 35%, in particular at least approximately 40% and/or at most approximately 65%, for example, at most approximately 58%.

It can be provided that the mixture comprises a pore-forming agent. For example, it can be provided that the mixture comprises at least approximately 5% by mass and/or at most approximately 20% by mass, for example approximately 10% by mass of pore-forming agent and/or that at least approximately 5% by mass and/or at most approximately 20% by mass, for example approximately 10% by mass of pore-forming agent is added to the mixture.

In one embodiment of the invention, it can be provided that at least one substance of the mixture is screened before a fusion with further substances of the mixture, and/or that the whole mixture is screened, such that the d10 of the at least one substance and/or of the mixture is at least approximately 5 µm, the d50 value of the at least one substance and/or of the mixture is at least approximately 35 µm, and/or the d90 value of the at least one substance and/or of the mixture is at least approximately 70 µm.

It can further be provided that at least one substance of the mixture is screened before a fusion with further substances of the mixture, and/or that the whole mixture is screened, such that the d10 of the at least one substance and/or of the mixture is at most approximately 10 µm, the d50 value of the at least one substance and/or of the mixture is at most approximately 40 µm, and/or the d90 value of the at least one substance and/or of the mixture is at most approximately 80 µm.

It can be favorable if the mixture before firing, and/or the molded article after firing, comprises at least approximately 50% by mass of cordierite, at least approximately 5% by mass of corundum and/or at least approximately 5% by mass of mullite.

It can further be provided that the mixture before firing and/or the molded article after firing comprises at most approximately 90% by mass of cordierite, at most approximately 50% by mass of corundum and/or at most approximately 30% by mass of mullite.

It can, for example, be provided that the finished moulded article comprises approximately 90% by mass of cordierite and otherwise substantially corundum, glass and/or mullite.

An amorphous component of the moulded article amounts to preferably at most 2%, for example, between approximately 0.5% and approximately 1%.

It can be particularly advantageous if the mixture before firing, and/or the moulded article after firing, comprises between approximately 50% by mass and approximately 90% by mass, in particular between approximately 50% by mass and 65% by mass, for example approximately 60% by mass of cordierite.

Furthermore, it can be provided that the mixture before firing, and/or the moulded article after firing, comprises between approximately 5% by mass and approximately 50% by mass, in particular between approximately 5% by mass and approximately 30% by mass, for example approximately 15% by mass of corundum.

Furthermore, it can be favourable if the mixture before firing, and/or the moulded article after firing, comprises between approximately 5% by mass and approximately 30% by mass, in particular between approximately 15% by mass and approximately 30% by mass, for example approximately 25% by mass of mullite.

In a further embodiment of the invention, it can be provided that the mixture before firing, and/or the molded article after firing, comprises at least approximately 50% by mass of mullite, at least approximately 10% by mass of corundum and/or at least approximately 10% by mass of zircon mullite.

It can be favorable if the mixture before firing and/or the molded article after firing comprises at most approximately 80% by mass of mullite, at most approximately 50% by mass of corundum and/or at most approximately 30% by mass of zircon mullite.

Herein, "mullite" is, in particular, "sintered mullite".

It can be favorable if the mixture before firing, and/or the molded article after firing, comprises between approximately 50% by mass and approximately 80% by mass, in particular between approximately 60% by mass and approximately 80% by mass, for example approximately 70% by mass of mullite, in particular sintered mullite.

It can further be favorable if the mixture before firing, and/or the molded article after firing, comprises between approximately 10% by mass and approximately 50% by mass, in particular between approximately 10% by mass and approximately 30% by mass, for example approximately 20% by mass of corundum, in particular sintered corundum.

Furthermore, it can be provided that the mixture before firing, and/or the molded article after firing, comprises between approximately 5% by mass and approximately 30% by mass, in particular between approximately 10% by mass and approximately 20% by mass, for example, approximately 10% by mass of zircon mullite.

The molded article is preferably fired at a temperature gradient of >2200° C., particularly >2200 K/m and/or >2200 K/h, for example, in a range between approximately 120° C. and approximately 2000° C.

In particular, a temperature of 1750° C. can be provided.

Preferably, the molded article is fired at a temperature of at most approximately 1400° C. In this way, binding of the particles of the base material to one another can be ensured while preserving the particulate property. In particular, undesirable conversion of the base material, for example melting of the particles of the base material at a temperature above approximately 1400° C. can be prevented.

The temperature is preferably selected so that solid body reactions lead to the formation of the dimensionally stable molded article.

The occurrence of a melt, in particular a melt of the powdered cordierite material and/or of the powered mullite material, is herein preferably prevented.

In one embodiment of the invention, it is provided that the molded article is fired at a temperature of approximately 1300° C. At this temperature, a solid binding of the particles of the base material to one another is ensured while preserving the particulate property.

It can be favorable if the molded article is fired in a firing cycle with a duration of at least approximately 300 minutes and/or at most approximately 480 minutes, for example, approximately 360 minutes.

A duration of the firing cycle should be understood to be the time between a beginning of the firing process of the molded article until an end of the firing process, in particular a removal of the molded article from a kiln.

In particular, this should be understood to be the duration between the beginning of the firing process and the cooling of the fired molded article.

The molded article is, in particular, a honeycomb body.

Preferably, the molded article is a ceramic molded article, in particular a porous ceramic molded article.

The invention also relates to a molded article, in particular a ceramic molded article, for example, a porous ceramic molded article.

In this regard, it is an object of the invention to provide a molded article which has good high temperature resistance and is easily manufactured.

This object is achieved according to the invention in that the molded article comprises a cordierite material and/or a mullite material, wherein particles of the cordierite material and/or particles of the mullite material are bonded to one another while preserving the particulate property.

Particles of the cordierite material and/or particles of the mullite material are preferably substance-to-substance bonded to one another while preserving the particulate property.

The molded article according to the invention can preferably be produced with the method according to the invention.

The molded article according to the invention preferably has individual or several of the features and/or advantages described in relation to the method according to the invention. Furthermore, the molded article preferably has individual or several features and/or advantages which result from the execution of individual or several of the aforementioned method steps.

The molded article is preferably manufactured from a powdered material. Preferably, the surfaces and/or boundary faces of the particles of the cordierite material and/or of the mullite material in the molded article are substantially like the surfaces of particles of a ground cordierite material and/or mullite material. In particular, by means of a scanning electron micrograph, clear boundaries of the particles of the cordierite material and/or of the mullite material relative to the environment are recognizable. The particles of the cordierite material and/or of the mullite material are preferably not fused together, but particularly merely embedded and/or integrated with one another, for example, substance-to-substance bonded to one another in punctiform manner.

The molded article is preferably a honeycomb body, in particular a filter body.

In particular, the molded article is suitable for use as a wall flow filter and/or as a flow-through filter, if appropriate, following further processing thereof.

The molded article can be formed, for example, in an extrusion process.

A molded article configured as a honeycomb body preferably has honeycombs arranged in a matrix form. In particular, it can be provided that the honeycomb body has a square cross-section and comprises honeycombs (cells) which are arranged in a matrix form and are configured cylindrical, wherein the honeycombs (cells) preferably also have a square cross-section.

It can be favorable if the molded article comprises 100, 200 or 300 cells per square inch.

Furthermore, the method according to the invention for producing a molded article and/or the molded article can have individual or several of the following features and/or advantages.

The particles of the base material remain preferably chemically and/or physically essentially unaltered during the firing of the molded article.

Preferably, the cordierite material and/or the mullite material of the molded article is not or is only to a non-appreciable extent produced during the firing of the molded article by conversion of a base material.

Preferably, during the firing of the molded article, no or only a non-appreciable phase change of the base material into a desired mineral phase, particularly into cordierite and/or mullite takes place.

The molded article can be produced, for example, from a mixture of cordierite chamotte, sintered corundum, sintered mullite, zircon mullite, zircon silicate and/or a sinter additive from the group of alkali metals and/or alkaline earth metals. In particular, by this means, there can be produced a molded article configured as a cordierite substrate which comprises, for example, a cordierite content of between approximately 20% by mass and approximately 90% by mass.

The molded article preferably has no expansion anisotropy.

A thermal shock parameter of the molded article is preferably greater than 300 K.

The molded article is preferably heatable and/or firable with a temperature gradient of at least approximately 2000 K per hour.

It can also be provided that a combination of sintered mullite, sintered corundum, zircon mullite, zircon silicate and/or a sinter additive from the group of alkali metals and/or alkaline earth metals is used for producing a molded article.

The molded article can be used, in particular, as a soot filter, in particular as a diesel soot particle filter.

The molded article is preferably dimensionally stable up to temperatures of more than approximately 1600° C., in particular with the use of a mullite material with a thermal shock parameter of more than 200 K, or up to temperatures above approximately 1500° C., for example, up to approximately 1550° C. with the use of cordierite material.

The base material is preferably a pre-sintered material which can be fired, in particular, by means of a reactive sintering process with a sintering additive, to a dimensionally stable body.

By means of selective screening of at least one substance, in particular the base material, and/or the mixture, a pore volume, particularly with a pore radius distribution of between approximately 0.004 mm and approximately 0.045 mm can be specifically set.

In particular, if the molded article is a fine-walled honeycomb body, the use of pore-forming agents to adjust the pore volume and the median of the particle size distribution can be advantageous. This is advantageous particularly if the spacing of the centers of two adjacent honeycomb walls of the molded article (the "pitch" P) extending parallel to one another is relatively small, for example less than 0.27 mm.

The molded body according to the invention is preferably more alkali-resistant and more corrosion-resistant than cordierite molded articles and/or mullite molded articles which are sintered at very high temperatures according to known production methods.

The coefficient of expansion of the molded article comprising, for example, mainly cordierite in the range between approximately 20° C. and approximately 800° C. is essentially identical in all three spatial directions and lies, for example, between approximately $1 \times 10^{-6}$/K and approximately $6 \times 10^{-6}$/K, for example between approximately $1.7 \times 10^{-6}$/K and approximately $4 \times 10^{-6}$/K. Alternatively thereto, it can be provided that the coefficient of expansion of the molded article comprising, for example, mainly mullite is, for example, approximately $5.2 \times 10^{-6}$/K.

It can be advantageous if the molded article is provided with a coating, in particular with a catalytically active coating.

The molded article can be formed, for example, in an pressing process and/or in an extrusion process.

It can be provided that the powdered base material, in particular the codierite material and/or the mullite material is pre-fired, for example at a temperature of up to approximately 1200° C. During firing of the molded article, the powdered base material is then preferably completely fired in order to preserve the final chemical property thereof The particulate property of the particles of the base material are herein preserved, however.

Preferably, the mixture and/or the molded article comprises aluminum oxide ($Al_2O_3$), glass, particularly magnesium aluminum silicate, mullite and/or aluminosilicate following the firing.

Preferably, aluminum oxide ($Al_2O_3$) is added to the mixture overstoichiometrically. By this means, in the event of undesirable overheating of the molded article during its use, for example as a particle filter, the molded article can resinter before any damage occurs.

It can be advantageous if the mixture comprises an additive in order to increase the strength of the molded article.

The thermal shock parameter is, in particular, a relative measure for an acceptable temperature difference based on the ratio between the bending strength of the material and the tension which is marked by a temperature gradient (in Kelvin per minute or Kelvin per hour). A molded article made of SiC has a thermal shock parameter of, for example, at most approximately 160 K. A molded article according to the invention preferably has a thermal shock parameter of at least approximately 180 K.

The temperature gradient denotes a spatially or time-dependent temperature gradient and is measured in Kelvin per meter or Kelvin per minute or Kelvin per hour. In particular, to denote the heating speed, the time-dependent temperature gradient is given in Kelvin per minute in the range between approximately 120° C. and for example approximately 2000° C. A smaller temperature gradient can lead to an increase in the coefficient of expansion, a change in the pore structure and/or to a decrease in strength. A higher temperature gradient, for example, higher than approximately 2300° C./h can lead to a dimensionally stable molded article, in particular a honeycomb body with sufficient strength.

For example, graphite, acrylate, acrylic glass, coconut flour and/or maize can be used as pore-forming agents for setting the degree of porosity and/or a pore size.

Further preferred features and/or advantages of the invention are the subject matter of the following description of individual exemplary embodiments.

In a first exemplary embodiment of a method for producing a molded article, in particular a honeycomb body, for example a diesel soot particle filter (DPF), it is provided that a mixture is used as the starting material. The mixture comprises a powdered base material which comprises pre-fired, calcinated substances, for example, cordierite, mullite, sintered mullite, corundum, sintered corundum and zircon mullite.

The substances are ground and/or screened in order to obtain a desired grain size distribution (particle size distribution).

In particular, the mixture, in particular the powdered base material, is ground and/or screened so that the d10 is between approximately 1 μm and approximately 2 μm, that the d50 value is between approximately 38 μm and approximately 49 μm and that the d90 value is between approximately 60 μm and approximately 80 μm. By this means, a pore volume of approximately 40% to approximately 58% can be obtained. A median of the pore size distribution preferably amounts to between approximately 10 μm and approximately 20 μm.

With a median of the pore size distribution of approximately 10 μm, the use of a pore-forming agent is preferably dispensable. However, the pore-forming agent can also be added in quantities of, for example, approximately 5% by mass to approximately 20% by mass in order, for example, to obtain an adjusted pore size distribution, in particular with a median of approximately 20 µm.

Alternatively, it can be provided that by means of an adjusted screening of the mixture, in particular the base material, a pore size distribution with a median of approximately 20 µm is obtained. For this purpose, the mixture, in particular the powdered base material is screened so that the d10 is between approximately 5 µm and approximately 10 µm, that the d50 value is between approximately 35 µm and approximately 40 µm and that the d90 value is between approximately 70 µm and approximately 80 µm.

The mineral composition of the base material amounts in the first embodiment to approximately 60% by mass of cordierite, approximately 15% by mass of corundum and approximately 25% by mass of mullite. Preferably a sinter-promoting material is added to the mixture. In particular, an aqueous solution which comprises approximately 0.1% by mass to approximately 2% by mass of alkali metal and/or alkaline earth metal ions is mixed in.

The mixture is then brought into a desired shape in a pressing process or an extrusion process.

The molded article thus obtained can then be, for example, freeze dried and further processed.

In particular, the molded article is subsequently fired in order to obtain its final strength.

The molded article is herein fired, for example, in a flow-through kiln at a feed rate of 10 cm/min to 30 cm/min, for example approximately 20 cm/min and a temperature gradient of more than 2200 K/h. The firing duration from the start of the firing process to the cooling down of the molded article is between approximately 300 minutes and approximately 480 minutes, for example approximately 360 minutes.

The temperature of the molded article during the firing is preferably at most approximately 1400° C., for example, approximately 1330° C. By this means, it can be ensured that the particles of the powdered base material, in particular the cordierite material and/or the mullite material also have their particulate property unchanged following the firing step. In particular, given a suitably magnified view, including after passing through the firing step, clear borders or edges of the particles of the base material are recognizable in the molded article.

Following production of the molded article, particularly following firing and cooling of the molded article, the molded article has, for example, a coefficient of expansion of between approximately $1.7 \times 10^{-6}$/K to $4 \times 10^{-6}$/K, in particular in the temperature range between approximately 20° C. and approximately 800° C.

The molded article can be used, in particular, as a honeycomb article, for example, as a diesel soot particle filter. For this purpose, the molded article can be provided, for example, with a catalytic coating.

A second embodiment of a method for producing a molded article and the molded articles obtained thereby differs from the method and the molded article according to the first embodiment essentially in that the powdered base material comprises approximately 70% by mass of sintered mullite, approximately 20% by mass of sintered corundum and approximately 10% by mass of zircon mullite. The molded article thereby obtained has a coefficient of expansion of approximately $5.2 \times 10^{-6}$/K in the temperature range between approximately 20° C. and approximately 800° C.

Otherwise, the method for producing a molded article and the molded article according to the second embodiment coincide regarding the production steps, the design, the properties and the function with the method for producing a molded article or with the molded article according to the first embodiment, so that in this regard, reference is made to the above description thereof.

Since in all the methods for producing a molded article, during firing of the molded article, particles of the base material are bonded to one another while preserving the particulate property, the molded article can be produced easily and can have a high temperature resistance.

That which is claimed:

1. A method for producing a molded article which is a filter body, the method comprising:
   providing a mixture comprising:
   a powdered base material which comprises a pre-fired and/or ground cordierite material and/or a pre-fired and/or ground mullite material;
   producing a molded article by molding the mixture;
   firing the molded article at a temperature of at most about 1400° C. and with a temperature gradient of at least 2000 K per hour so that particles of the base material are bonded to one another while preserving the particulate property.

2. The method according to claim 1, wherein the mixture comprises corundum, zircon mullite and/or zircon silicate.

3. The method according to claim 1, wherein the mixture also comprises an alkali metal-containing and/or alkaline earth metal-containing material and/or that additionally an alkali metal-containing and/or alkaline earth metal-containing material is mixed into the mixture for molding thereof.

4. The method according to claim 1, wherein at least one substance of the mixture is screened before mixing with further substances of the mixture and/or that the whole mixture is screened, in order to obtain a desired grain size distribution.

5. The method according to claim 1, wherein at least one substance of the mixture is screened before mixing with further substances of the mixture and/or that the whole mixture is screened such that
   the d10 value of the at least one substance and/or of the mixture is at least approximately 1 µm,
   the d50 value of the at least one substance and/or of the mixture is at least approximately 38 µm, and/or
   the d90 value of the at least one substance and/or of the mixture is at least approximately 60 µm.

6. The method according to claim 1, wherein at least one substance of the mixture is screened before mixing with further substances of the mixture and/or that the whole mixture is screened such that
   the d10 of the at least one substance and/or of the mixture is at most approximately 2 µm,
   the d50 value of the at least one substance and/or of the mixture is at most approximately 49 µm, and/or
   the d90 value of the at least one substance and/or of the mixture is at most approximately 80 µm.

7. The method according to claim 1, wherein at least one substance of the mixture is screened before mixing with further substances of the mixture and/or that the whole mixture is screened such that
   the d10 of the at least one substance and/or of the mixture is at least approximately 5 µm,
   the d50 value of the at least one substance and/or of the mixture is at least approximately 35 µm, and/or
   the d90 value of the at least one substance and/or of the mixture is at least approximately 70 µm.

8. The method according to claim 1, wherein at least one substance of the mixture is screened before mixing with further substances of the mixture and/or that the whole mixture is screened such that the d10 of the at least one substance and/or of the mixture is at most approximately 10 μm,
the d50 value of the at least one substance and/or of the mixture is at most approximately 40 μm, and/or
the d90 value of the at least one substance and/or of the mixture is at most approximately 80 μm.

9. The method according to claim 1, wherein the mixture before the firing and/or the molded article after the firing comprises at least approximately 50% by mass of cordierite, at least approximately 5% by mass of corundum and/or at least approximately 5% by mass of mullite.

10. The method according to claim 1, wherein the mixture before the firing and/or the molded article after the firing comprises at most approximately 90% by mass of cordierite, at most approximately 50% by mass of corundum and/or at most approximately 30% by mass of mullite.

11. The method according to claim 1, wherein the mixture before the firing and/or the molded article after the firing comprises at least approximately 50% by mass of mullite, at least approximately 10% by mass of corundum and/or at least approximately 10% by mass of zircon mullite.

12. The method according to claim 1, wherein the mixture before the firing and/or the molded article after the firing comprises at most approximately 80% by mass of mullite, at most approximately 50% by mass of corundum and/or at most approximately 30% by mass of zircon mullite.

13. The method according to claim 1, wherein the molded article is fired in a firing cycle with a duration of at least approximately 300 min and/or at most approximately 480 min and/or with a temperature gradient of >2200° C./h.

* * * * *

UNITED STATES PATENT AND TRADEMARK OFFICE
CERTIFICATE OF CORRECTION

PATENT NO. : 10,233,124 B2
APPLICATION NO. : 14/848964
DATED : March 19, 2019
INVENTOR(S) : Vieweger Page 1 of 2

It is certified that error appears in the above-identified patent and that said Letters Patent is hereby corrected as shown below:

In the Specification

Column 3, Line 20, the text "the d10 of the at least one substance" should be changed to -- the d10 value of the at least one substance --

Column 3, Line 26, the text "A d10 should be understood" should be changed to -- A d10 value should be understood --

Column 3, Line 45, the text "the d10 of the at least one substance" should be changed to -- the d10 value of the at least one substance --

Column 4, Line 5, the text "the d10 of the at least one substance" should be changed to -- the d10 value of the at least one substance --

Column 4, Line 17, the text "the d10 of the at least one substance" should be changed to -- the d10 value of the at least one substance --

Column 8, Line 54, the text "and/or screened so that the d10 is" should be changed to -- and/or screened so that the d10 value is --

Column 9, Line 8, the text "d10 is between approximately" should be changed to -- d10 value is between approximately --

In the Claims

Column 10, Claim 6, Line 48, the text "the d10 of the at least one substance" should be changed to -- the d10 value of the at least one substance --

Column 10, Claim 7, Line 58, the text "the d10 of the at least one substance" should be changed to -- the d10 value of the at least one substance --

Signed and Sealed this
Twenty-fourth Day of September, 2019

Andrei Iancu
*Director of the United States Patent and Trademark Office*

Column 11, Claim 8, Line 1, the text "the d10 of the at least one substance" should be changed to
-- the d10 value of the at least one substance --